(No Model.)

D. F. TURNER.
India Rubber Spring.

No. 241,452. Patented May 10, 1881.

WITNESSES
N. J. Cambridge
H. W. Adams

INVENTOR
Dawson F. Turner
by J. H. Adams
Atty.

United States Patent Office.

DAWSON F. TURNER, OF BOSTON, MASSACHUSETTS.

INDIA-RUBBER SPRING.

SPECIFICATION forming part of Letters Patent No. 241,452, dated May 10, 1881.

Application filed December 11, 1880. (No model.)

*To all whom it may concern:*

Be it known that I, DAWSON F. TURNER, of Boston, in the county of Suffolk and State of Massachusetts, have invented a new and useful Improvement in India-Rubber Springs, of which the following is a specification.

My invention relates to a method of treating india-rubber when used in the form of a door-spring, a chest-expander, or in connection with machinery where a resilient force is required, so that in extending or stretching the india-rubber it will retain its connection with the ends at which it is held without injury to the rubber or rendering it liable to break, however much it may be used as a resilient force.

The invention consists in tightly binding the india-rubber at the ends or other desired portion while such ends or portion are in a state of tension, with a cord, wire, or other suitable material, so as to compress the same and hold them permanently in a compressed state, and so that when the rubber is extended in order to utilize its resilient force the compressed portion or portions will not be affected thereby, and so be rendered suitable for holding or griping the said india-rubber.

Figure 1:
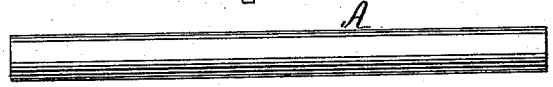
Figure 2:
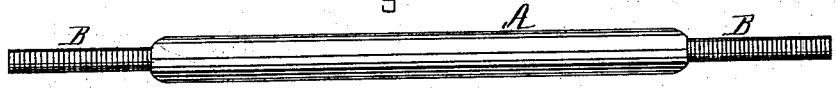
Figure 3:
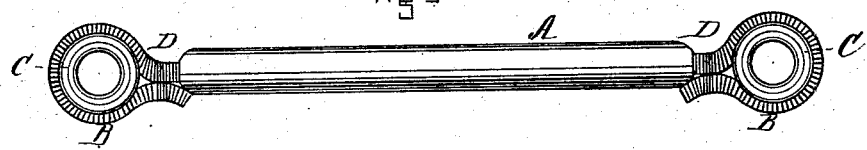

Referring to the accompanying drawings, Figure 1 represents a cylindrical piece of india-rubber in its normal condition. Fig. 2 shows the same piece of rubber having its ends, after being extended, wound with a cord or wire to hold it in a compressed condition. Fig. 3 represents a piece of rubber having its compressed ends attached to rings or eyelets to adapt it for use as a door-spring or for handles to a chest-expander, &c.

A represents a piece of india-rubber of cylindrical form, either solid or tubular, and of any desired length. Instead of cylindrical, the piece of rubber may be of any other suitable form.

In carrying out my invention I reduce the ends, or such other portion as may be desirable, of a piece of india-rubber by compressing and extending the same so as to considerably reduce its diameter, and upon such reduced ends I wind tightly a cord or wire; or I may use for the purpose a strip of cloth, metal, or other suitable material, so as to permanently retain such parts in a compressed condition. The winding of the cord may be effected by machinery or by any other suitable means. When released from tension, and with the cord or wire wound upon the reduced portion of the rubber in a compressed condition, it assumes the form shown in Fig. 2, the body A and the reduced portions B being in one piece.

In Fig. 3 the reduced and compressed ends B are shown as surrounding and fastened by cords or wires D upon rings C, so as to adapt the device for use as a door-spring, or when handles are desired, as in a chest-expander.

In some cases it may be desirable to compress and bind the central portion of the india-rubber A, to provide for its use as a double resilient power.

India-rubber springs as commonly used for resilient force are liable to break or give way at or near their holding ends, and thus become useless; but in my invention the compressed portions that constitute the holding parts, being integral with the body of the spring and protected by the binding cord or wire, are not subject to wear or abrasion, and consequently will not break or give way at these points.

What I claim as my invention, and desire to secure by Letters Patent, is—

1. An india rubber spring, A, having its ends B B compressed and wound with a cord or wire under tension, substantially as and for the purpose set forth.

2. The combination, with a rubber spring, A, having its ends B compressed and wound with a cord or wire, as set forth, of rings C, as and for the purpose specified.

3. As an article of manufacture, a cylindrical or other shaped rubber spring, A, having the compressed and wound ends B and the rings or eyelets C, as set forth.

In testimony whereof I have signed my name to this specification in the presence of two subscribing witnesses.

DAWSON F. TURNER.

Witnesses:
JOS. H. ADAMS,
J. BROWN LORD.